Jan. 28, 1969   J. H. CARLSON ET AL   3,424,273
GREASE CARTRIDGE
Filed Nov. 19, 1965
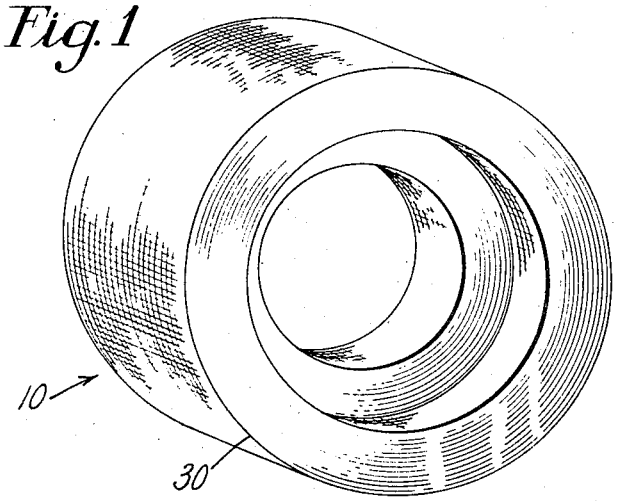
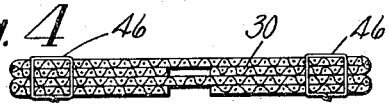
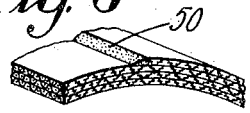
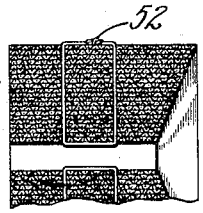
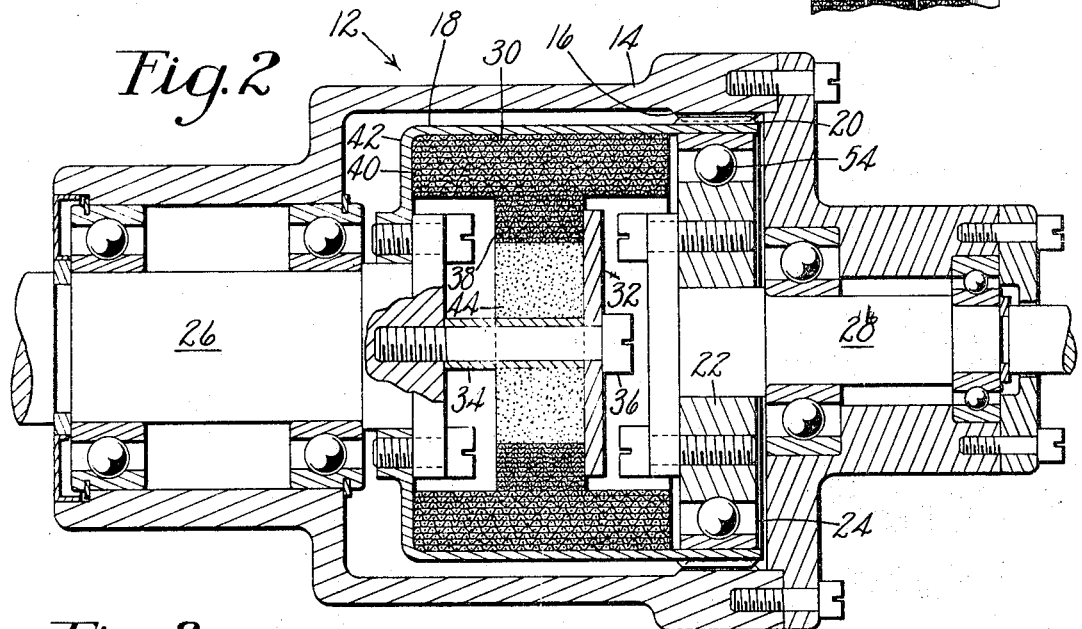
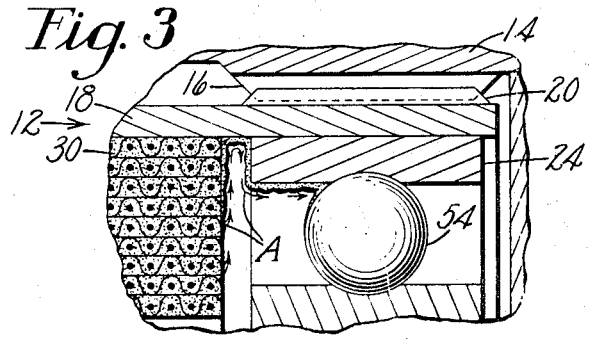
*Inventors*
John H. Carlson
Ernest H. Scott
By their Attorney
Carl E. Johnson.

United States Patent Office 3,424,273
Patented Jan. 28, 1969

3,424,273
GREASE CARTRIDGE
John H. Carlson, Danvers, and Ernest H. Scott, Marblehead, Mass., assignors to United Shoe Machinery Corporation, Boston, Mass., a corporation of New Jersey
Filed Nov. 19, 1965, Ser. No. 508,715
U.S. Cl. 184—98                                4 Claims
Int. Cl. F16n 15/00, 39/00; F16c 1/24

ABSTRACT OF THE DISCLOSURE

A lubrication cartridge, especially for grease, comprises superimposed plies of heat-resistant screen or cellular material which may be mounted in different positions of orientation and effectively retains the lubricant against shock and vibration, yet allows it to bleed at an appropriate rate when exposed to heat. Plastic screening is useful in low cost applications, and metal screen cartridges may be used in refillable applications. A wound coil form may advantageously have an end face disposed adjacent to a circular bearing.

---

This invention relates to a lubricating device, and more especially to the provision of reusable or replaceable grease cartridges of improved construction. The invention is herein illustrated as embodied in an actuator of the harmonic drive type, but it will be understood that the invention is not thus limited and has advantageous application in many types of mechanical assembly, particularly where a bearing or other parts subject to friction and heat are in need of lubricant over an extended period of operation. Only a few variant forms of the invention are herein shown by way of example.

When a mechanism is operable in more than one position of orientation, or for some other reason it is impracticable to provide a lubrication sump, other lubricating means including, for instance impregnated pads, and wicking devices have been used to provide lubricant to relatively moving parts. In some cases these have been adequate, but often the approach taken has not been economical, and has failed to insure the availability of lubricant exactly where needed or has failed to do so reliably for the desired period of operating time.

In the light of the foregoing, it is a primary object of this invention to provide a relatively inexpensive grease cartridge of nonerosive structure which may be reused or replaced and which has reliable lubricating characteristics over an extended period regardless of its orientation during operation.

In accordance with this object, a feature of the invention resides in the provision of a lubricating device comprising a single cellular body or a plurality of superimposed plies of durable, heat conductive or heat-resistant screen or net material adapted to be mounted closely adjacent to working parts, and grease packed between the plies in intimate contact with the material. In a preferred form the cartridge comprises a coil of metallic screening wound from a suitable strip, the coil having a diameter and configuration enabling a large quantity of grease to be stored therein which is available by bleeding as needed by nearby mechanism subject to friction, the extent of the bleeding being increased during any excessive temperature rise in the mechanism. In addition to being nonabsorbent as compared to many wicking devices, and hence affording more bleeding capability for a given size, the semirigid grease cartridge contemplated by our invention retains lubricant despite the influences of shock, motion, vibration, and shifting in orientation of operating elements. Moreover, unlike some lubricating devices subject to unraveling and other deterioration inevitably incurred such as to introduce aggravating foreign matter to the parts to be lubricated, the coiled strip of this invention, whether of metal or plastic, preferably has selvage and will not erode or disintegrate in normal operation.

The foregoing and other features of the invention together with novel details of construction will now be more particularly described in connection with an illustrative embodiment thereof and with reference to the accompanying drawings in which:

FIG. 1 is a perspective view of one form of a grease cartridge according to our invention;

FIG. 2 is an axial section of a harmonic drive actuator wherein the cartridge shown in FIG. 1 is mounted by way of illustration;

FIG. 3 is a enlarged detail view of a portion of the cartridge shown in FIG. 2 and showing lubricant bleeding action during operation;

FIG. 4 is a transverse section of a cartridge according to this invention and indicating one selvage and securing means; and FIGS. 5–7, inclusive, are views similar to FIG. 4 and showing modified selvage in fragments of different grease cartridges according to our invention.

By way of illustration the invention will first be described with reference to FIGS. 1–3, inclusive, and relating to a grease cartridge generally designated 10 as employed in an actuator 12 of the harmonic drive type. Such actuators are used as speed increasers or speed reducers which are required to be mounted in different orientation dependent on particular applications. For a more complete explanation of such actuators and their construction, reference may be had, for instance, to United States Letters Patent No. 2,906,143, issued Sept. 29, 1959 in the name of C. Walton Musser. The actuator 12 as herein shown comprises three basic elements, namely a rigid circular spline 14 (FIGS. 2 and 3) formed with internal teeth 16, a coaxial flexspline 18 having a lesser number of external teeth 20 arranged to mesh with the circular spline teeth at spaced circumferential localities, and a wave generator 22 which, with its bearing 24, generates a continuous wave of radial deflection in the flexspline and hence effects tooth interengagement to produce a rotary output in one of the shafts 26, 28 the other of which serves as an input member.

The drive mechanism 12 for present purposes is representative of many assemblies in that its operating parts are subjected to load, friction, and hence heat. Its performance is typical too in that in at least one area, namely, that of the wave generator bearing 24, there is need for more or less continuous supply of lubricant to the rolling elements and races. Since the circular spline is shown as formed internally of a cup-like housing, it is apparent that the mechanism 12, when horizontal as shown, may serve satisfactorily as an oil sump. When the exemplary mechanism is otherwise mounted, however, other provision must be taken to insure lubricant continously reaching the bearing in needed quantity. The cartridge 10 next to be described is particularly well suited to lubricate the bearing 24 in all operating positions of the actuator 12, and for the same reasons is adaptable to feeding lubricant to moving parts of any mechanism in need thereof.

The cartridge 10 comprises a plurality of turns of heat conductive and/or heat-resistant screen material 30, for example a copper, bronze, or aluminum or plastic wire mesh having a fineness on the order of approximately 10 to 30 openings per linear inch. Since the flexspline 18 provides a hollow cylindrical interior for receiving the cartridge and it is desired to provide an assuredly ample supply of lubricant, the turns of screening may be wound coaxially on a mandrel and preferably from a strip the width of which may correspond to the available space to be occupied. Thus in this case the cartridge 10 is spaced axially on the order of 1/16" to 1/8" from the bearing 24 by means of a plate 32, tubular spacer 34, and a screw 36 extending through the spacer and threaded into the shaft 26, the plate 32 abutting a narrower portion 38 of the strip to hold a wider outer portion 40 confined against an inturned flange or diaphragm 42 of the flexspline 18.

Although not illustrated herein, the cartridge 10 may be prepackaged and/or mounted within a thin-walled cylinder or sleeve the axial length of which is slightly more than that of the screen material, the cylinder abutting the bearing race thereby to space the material predeterminedly therefrom. Preferably the turns of screen material 30, which may but need not be taut, are radially spaced slightly from one another but substantially concentrically and form a semirigid unit. Though not critical, the radial spacing (if any) of turns may roughly accord with 1/4 to 1/2 a dimension of the screen openings, larger openings being used for higher viscosity grease. A grease 44, of the specification recommended for the particular mechanism to be lubricated, is packed into the openings in the screen material 30 and between its turns for intimate contact therewith. The grease may be forced into the completed cartridge by pressure using simple suitable tooling. During installation or prior thereto an additional reservoir of grease may be applied to fill a central aperture in the cartridge 10.

It is usually preferable, in order to avoid any possibility of screen material eroding from its cartridge, to provide selvage. FIG. 4 shows selvage provided by having opposite edges of the strip folded inwardly prior to coiling. Incidentally, the cartridge 10 need not be helically wound from only one strip of screen, but may consist of coaxial, discrete turns, and may indeed not be annular, but simply include superimposed plies of durable, heat conductive or heat-resistant screening material arranged, for example, in a flat or curved pack of desired size, filled with grease, and held assembled in any suitable manner, for instance, by wires 46, 46 (FIG. 4).

Selvage may, as indicated in FIG. 5, be afforded by an outer ply 48 wrapped over the edges of several inner turns and terminating inwardly thereof. In FIG. 6 selvage and binding of several turns of grease-carrying screening of a cartridge are accomplished by a seam of epoxy 50. FIG. 7 shows a cartridge 10 the screen 30 of which was wound from a tapered strip better to accommodate axially disposed adjacent parts, a wire or other filament 52 holding the turns assembled.

As the parts to be lubricated become heated in operation, the heat is transmitted to the material 30 and circulating ambient air and hence to the grease 44. This is indicated by arrows in FIG. 3, the grease exposed to the material and heated air releasing or bleeding fluid toward balls 54 of the bearing 24. The fluid thus made available "creeps" over the intervening surfaces, wetting (and lubricating) all dry surfaces as it progresses toward the hotter zone in the vicinity of the balls 54 and thereby insures adequate lubrication of the relatively moving surfaces. The cartridge material 30, being of a nonabsorbent material, makes all the fluid thus bled from the grease available for use as, and when, required. It is to be noted, too, that despite shock and vibration the grease will be retained essentially in its initial distributed state in the maze of the screen. At periodic inspections the cartridge 10 may be wholly replaced or simply repacked with grease as required.

Having thus described our invention, what we claim as new and desire to secure by Letters Patent of the United States is:

1. A nonrigid lubricating device comprising cellular material adapted to receive heat from adjacent parts to be lubricated, said material providing a substantially uniform mesh for retaining grease to be held thereby while releasing fluid therefrom for bleeding to said parts.

2. A lubricating device comprising superimposed, plies of heat resistant net material providing a mesh, the fineness of said mesh being uniform and sufficient to retain against vibration grease packed between the plies and in said mesh for intimate contact with the net material.

3. A lubricating cartridge comprising a plurality of turns of heat-resistant screen material spaced for retaining grease disposed in the openings of the screen material and between its turns and available for increased bleeding therefrom upon a rise in operating temperature.

4. For mounting adjacent to relatively movable parts to be lubricated, a lubrication cartridge including at least one semirigid coil of wound screen material, the material being heat resistant and having a mesh on the order of 10 to 30 openings per linear inch.

References Cited

UNITED STATES PATENTS 1,027,538  5/1912  Hall _____ 184—98

HOUSTON S. BELL, JR., *Primary Examiner.*

U.S. Cl. X.R.

308—187; 29—149.5, 163.5